UNITED STATES PATENT OFFICE 2,516,103

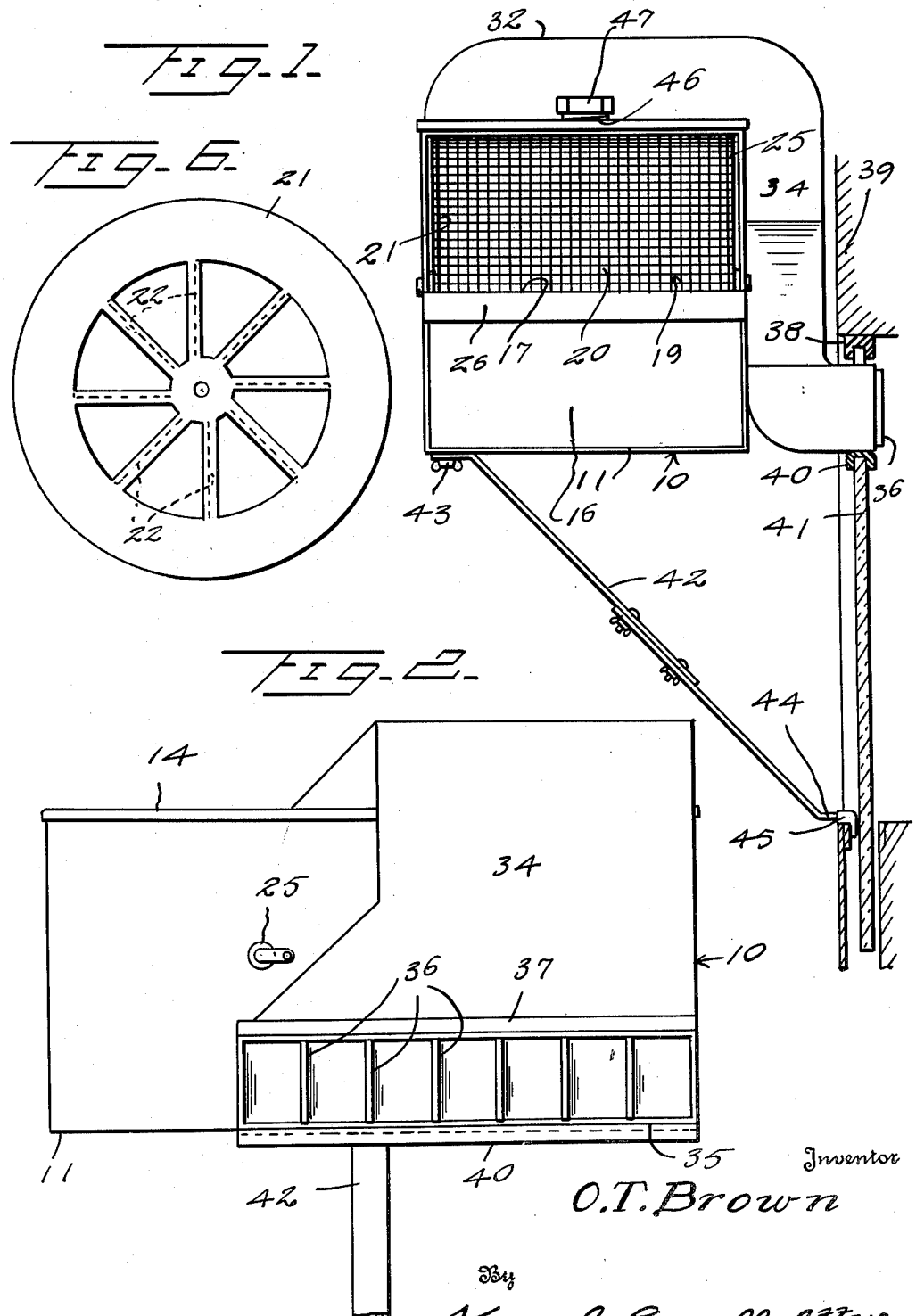

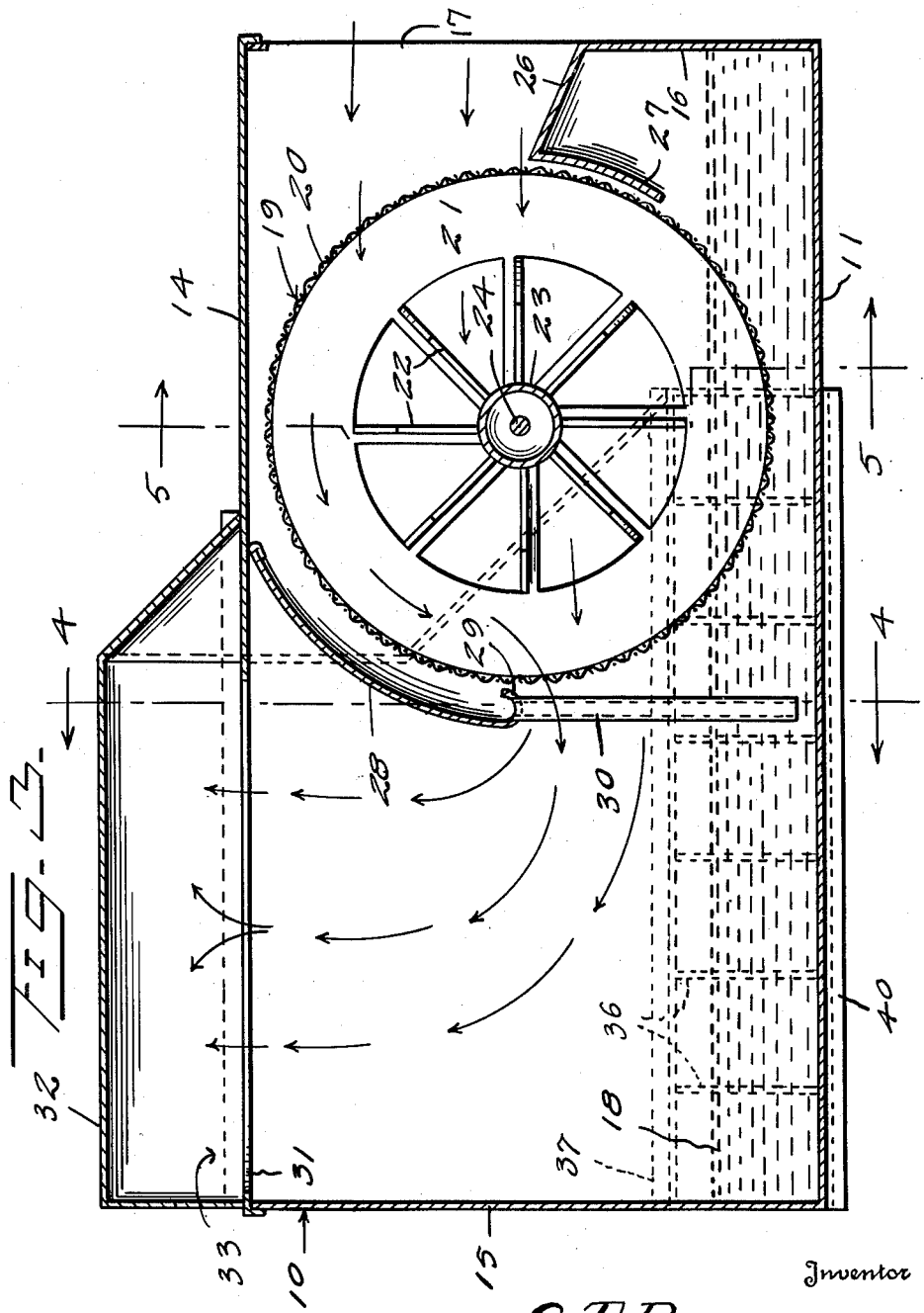

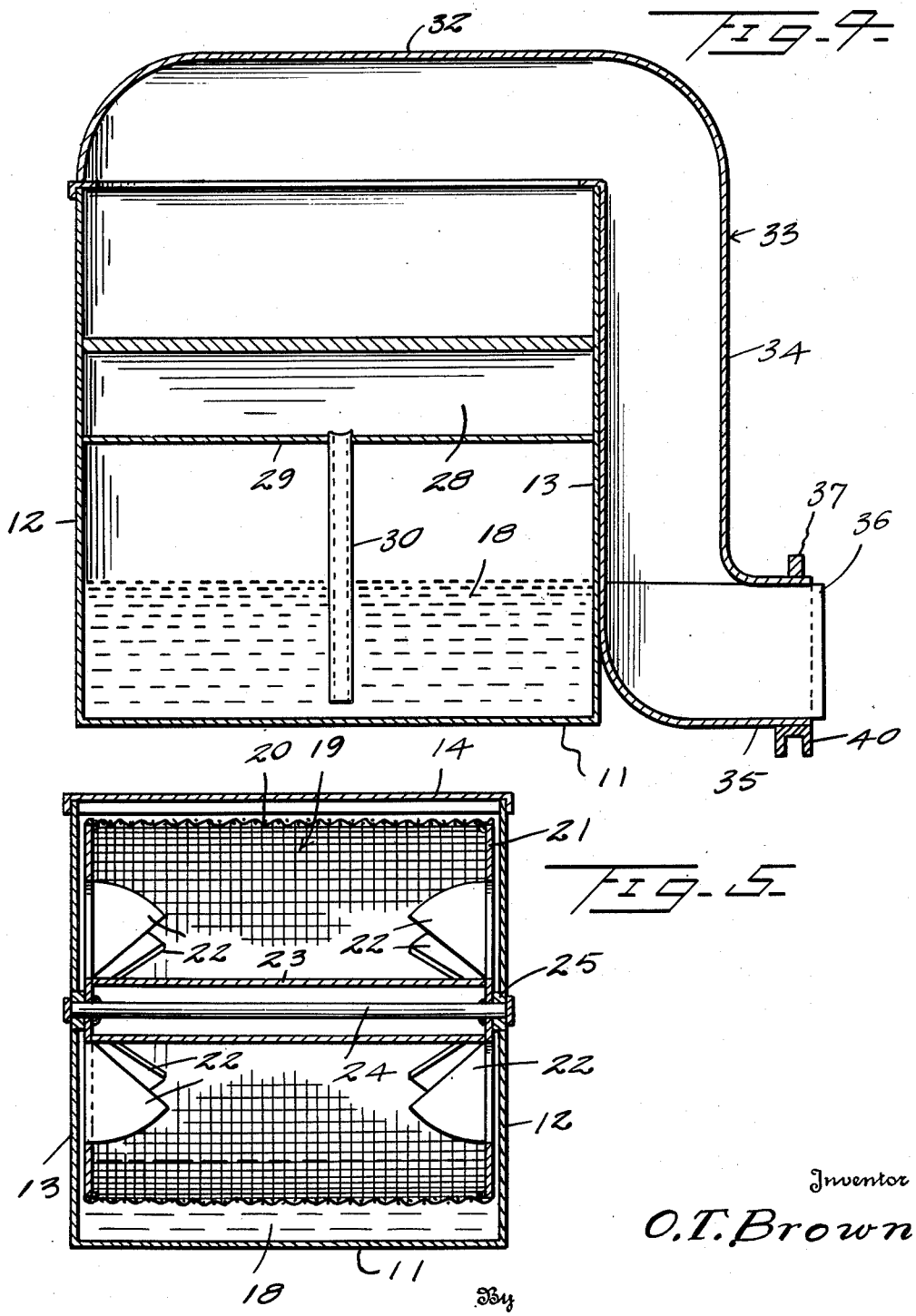

AIR CONDITIONER FOR VEHICLES

Orrin T. Brown, San Angelo, Tex.

Application October 21, 1947, Serial No. 781,103

1 Claim. (Cl. 261—92)

This invention relates to air conditioning devices for vehicles.

An object of this invention is to provide an air conditioning means for mounting on the outer side of a vehicle in a window opening for directing air into the vehicle and at the same time cooling and humidifying the air.

Another object of this invention is to provide a device of this kind which operates from the movement of the vehicle, the air rotating a humidifying drum and being cooled as the air passes through the drum which is formed with a screen cylindrical wall.

A further object of this invention is to provide a device of this kind which is of simple construction and can be mounted on any vehicle, being supported in a window opening by raising the glass to engage the lower side of the intake duct or nozzle and to clamp the upper side of the intake duct or nozzle in the upper edge of the window frame.

A further object of this invention is to provide a device of this kind which will not only cool and humidify the air but will also remove dust particles so that the air entering the interior of the vehicle through the device will be clean, cool and humidified air.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

Figure 1 is a detailed front elevation of a device constructed according to an embodiment of this invention, showing the device in applied position in a window opening of a vehicle which is shown in fragmentary vertical section.

Figure 2 is an inner side elevation of the device, partly broken away and in section.

Figure 3 is a longitudinal section of the device.

Figure 4 is a sectional view taken on the line 4—4 of Figure 3.

Figure 5 is a sectional view taken on the line 5—5 of Figure 3.

Figure 6 is a detailed end elevation of the screen drum.

Referring to the drawings, the numeral 10 designates generally an elongated housing which is formed of a bottom wall 11, outer and inner side walls 12 and 13, respectively, a top wall 14 and opposite end walls 15 and 16. The end wall 16 is the front end wall and is formed with an intake opening 17 through which air is adapted to pass. The housing 10 is adapted to contain a quantity of water which may be disposed at substantially the level indicated at 18. A rotary drum, generally designated as 19, is disposed at the forward portion of the housing 10 and is adapted to partly dip into the water disposed in the housing. The drum 19 is formed of a perforate or screened cylindrical wall 20 which is of relatively large mesh and the cylindrical wall 20 is secured to end walls 21.

The end walls 21 are provided with a plurality of inwardly projecting blades 22 which are adapted upon passage of air through the screen side wall 20 to effect rotation of the drum within the housing 10. The end members 21 are secured to a tubular hub 23 and a shaft 24 extends through the center of the hub 23 and is journalled in bearings 25 which are carried by the side walls 12 and 13 of the housing 10.

The front end wall 16 has extending inwardly and upwardly therefrom an air directing wall 26 and an arcuate depending wall 27 extends from the inner upper end of the air guiding wall 26. The wall 26 is adapted to direct the air above the axial center of the drum 19 so as to provide for rotation of this drum by the inwardly moving air. A depending baffle 28 of transversely arcuate configuration is fixed to the inner side of the housing 10 being secured to the top wall 14 and disposed in inwardly spaced relation to the cylindrical wall 20 of the drum 19. The baffle 28 is adapted to draw the air which passes through the drum 19 downwardly toward the upper surface of the water in the housing and also provides a means whereby globules of water which are drawn off of the drum 19 by the air will impinge against the baffle 28 and will not be carried into the vehicle.

The baffle 28 is provided on its lower edge with a trough 29 for catching water which may impinge against the concave side of the baffle 28 and the trough 29 has fixed thereto a depending drainpipe 30 which will return the water in the trough 29 to the bottom of the housing 10. The housing 10 is formed with an opening 31 in the top wall 14 thereof rearwardly of the drum 19 and the horizontal outer portion 32 of an air duct 33 is disposed over the opening 31. The air duct 33 includes an inner vertical downwardly extending duct 34 which is connected to a discharge nozzle 35. The nozzle or discharge member 35 has mounted therein a plurality of vertically disposed and horizontally spaced apart vanes 36 which will provide for the even discharge of air from the nozzle or exhaust member 35. The exhaust member 35 has fixed to the upper side thereof a rib 37 which is adapted to engage in the upper channel 38 which is carried by the window frame 39 of the vehicle. The nozzle 35 has fixed to the lower side thereof an inverted U-shaped or channel member 40 which is adapted to engage over the upper edge of the window pane 41 when the latter is raised as shown in Figure 1.

The housing 10 is adapted to be braced in laterally extending position from the side of the vehicle by means of an extensible brace 42 which is fixed as at 43 to the bottom of the housing 10 and is provided at its inner lower end with an L-shaped foot 44. The foot 44 is adapted to engage between the outer side of the window pane 41 and to extend into the window opening as shown in Figure 1. A rubber cover or cushion member 45 is engaged over the foot 44 so that the sill of the window opening and the glass will not be injured by the lower end of the bracing member.

The housing 10 is provided with a filler neck 46 closed by a cap 47 so that water can be discharged into the housing 10.

In the use and operation of this device the housing 10 is secured in the window opening of the vehicle by partially lowering the window pane and engaging the upper rib 37 with the channel member normally found in a vehicle window opening at the top thereof. The window pane 41 is then raised to engage the inverted U-shaped member 40 and the bracing member 42 is engaged at its lower end with the lower edge of the window opening. As the vehicle moves along the road, the air will enter the intake opening 17 at the front of the housing 10 and this air will pass through the drum 19 which will be rotated by the blades 22. As the drum 19 rotates the screen cylindrical wall 20 will be moistened by dipping into the water 18 and the moving stream of air will pick up this moisture. The air passing through the drum 19 will be cooled and humidified by contact with the moistened screen and this cooled and humidified air will then be discharged through the discharge member 35 into the vehicle.

I claim:

An air conditioner for mounting in a window opening of a vehicle comprising a housing having an opening in the front wall thereof, that portion of said housing below said opening constituting a water reservoir, an inverted L-shaped outlet duct extending from the top wall of said housing and formed with a right angularly disposed discharge duct disposed at the lower portion of said housing, a channel member fixed to the lower side of said discharge duct engageable over the upper edge of a window panel, a rib carried by the upper side of said discharge duct engageable in the channel of the upper portion of the window frame, an extensible brace fixed to the bottom of said housing adjacent the outer portion thereof, said brace projecting downwardly and inwardly and engageable in the lower panel slot of said window frame, a perforate drum rotatably carried by said housing and having the peripheral surface thereof confronting said intake opening, said drum projecting partly into said reservoir, fins carried by said drum for effecting rotation thereof by air passing therethrough, a downwardly extending curved baffle in said housing having the concave side thereof facing the inner side of said drum, a trough carried by the lower edge of said baffle and disposed between the latter and said drum for catching water flowing downwardly on said baffle and also catching globules thrown centrifugally from said drum, and a pipe communicating said trough with said reservoir.

ORRIN T. BROWN.

REFERENCES CITED

The following references are of record in the file of this patent:

UNITED STATES PATENTS

| Number | Name | Date |
| --- | --- | --- |
| 61,555 | Moore | Jan. 29, 1867 |
| 1,484,745 | Wadsworth | Feb. 26, 1924 |
| 1,846,057 | Ilg | Feb. 23, 1932 |
| 1,953,537 | Miller et al. | Apr. 3, 1934 |
| 2,192,332 | Schmeig | Mar. 5, 1940 |
| 2,230,020 | Webster | Jan. 28, 1941 |
| 2,435,798 | Rice et al. | Feb. 10, 1948 |

FOREIGN PATENTS

| Number | Country | Date |
| --- | --- | --- |
| 58,602 | Switzerland | Oct. 28, 1911 |